United States Patent
Saito et al.

(10) Patent No.: US 9,950,784 B2
(45) Date of Patent: Apr. 24, 2018

(54) WHEEL DRIVE SYSTEM FOR AIRCRAFT

(71) Applicants: SINFONIA TECHNOLOGY CO., LTD., Tokyo (JP); IHI AEROSPACE CO., LTD., Tokyo (JP); SUMITOMO PRECISION PRODUCTS CO., LTD., Amagasaki-shi, Hyogo (JP)

(72) Inventors: Hiroshi Saito, Tokyo (JP); Nobuyuki Nakanishi, Tokyo (JP); Hitoshi Oyori, Tokyo (JP); Masayuki Takada, Amagasaki (JP)

(73) Assignees: SINFONIA TECHNOLOGY CO., LTD., Tokyo (JP); IHI AEROSPACE CO., LTD., Tokyo (JP); SUMITOMO PRECISION PRODUCTS CO., LTD., Hyogo (JP)

( * ) Notice: Subject to any disclaimer, the term of this patent is extended or adjusted under 35 U.S.C. 154(b) by 269 days.

(21) Appl. No.: 14/673,315

(22) Filed: Mar. 30, 2015

(65) Prior Publication Data

US 2015/0274285 A1   Oct. 1, 2015

(30) Foreign Application Priority Data

Apr. 1, 2014   (JP) ................................. 2014-075751

(51) Int. Cl.
    *B64C 25/40*   (2006.01)
    *B64C 25/34*   (2006.01)

(52) U.S. Cl.
    CPC ............ *B64C 25/405* (2013.01); *B64C 25/34* (2013.01); *B64C 25/40* (2013.01); *Y02T 50/823* (2013.01)

(58) Field of Classification Search
    CPC ............ B64C 25/405; B60K 6/00; B60K 6/20
    See application file for complete search history.

(56) References Cited

U.S. PATENT DOCUMENTS

| 8,857,544 B2* | 10/2014 | Essinger | ............... B64C 25/405 180/65.51 |
| 2009/0218440 A1* | 9/2009 | Dilmaghani | .......... B64C 25/405 244/50 |
| 2012/0228921 A1* | 9/2012 | Essinger | ............... B64C 25/405 301/6.2 |

FOREIGN PATENT DOCUMENTS

| EP | 2243703 A1 | 10/2010 |
| JP | 2007-112408 A | 5/2007 |
| JP | 2009-023629 A | 2/2009 |

(Continued)

OTHER PUBLICATIONS

Extended European Search Report dated Sep. 9, 2015, issued in counterpart Application No. 15161265.2. (5 pages).

(Continued)

*Primary Examiner* — John D Walters
*Assistant Examiner* — James J Triggs
(74) *Attorney, Agent, or Firm* — Westerman, Hattori, Daniels & Adrian, LLP

(57) ABSTRACT

Provided is a wheel drive system for aircraft RS including a motor 2 that is connected to a wheel 12, and provided with two voltage supply lines L1 and L2 for supplying the voltages Vta and Vpr with varying the length of a winding 21 to be energized; a voltage supply unit for supplying the voltage Vta and Vpr to the two voltage supply lines L1 and L2; and a control unit 8 for controlling the voltage supply unit, wherein the control unit 8 is configured to select one of the two voltage supply lines L1 and L2, and supply the voltage Vta or Vpr, by controlling the voltage supply unit.

7 Claims, 4 Drawing Sheets

(56) References Cited

FOREIGN PATENT DOCUMENTS

| | | |
|---|---|---|
| JP | 2009-219174 A | 9/2009 |
| JP | 2013-514229 A | 4/2013 |
| JP | 2013-121222 A | 6/2013 |
| WO | 2014/023941 A1 | 2/2014 |

OTHER PUBLICATIONS

Office Action dated Nov. 14, 2017, issued in Japanese Patent Application No. 2014-075751, with translation.

* cited by examiner

WHEEL DRIVE SYSTEM FOR AIRCRAFT

CROSS-REFERENCE TO RELATED APPLICATIONS

This application claims priority of Japanese Patent Application No. 2014-075751 filed on Apr. 1, 2014. The contents of the applications are incorporated herein by reference in their entirety.

BACKGROUND OF THE INVENTION

1. Field of the Invention

Embodiments of the present invention relate to a wheel drive system for aircraft for rotating a wheel of an aircraft.

2. Description of the Related Art

Conventionally, an aircraft utilizes the power of an engine for flight for movement in an airport (taxiing). Generally, a moving speed obtained by such power is greater than a moving speed for safe taxiing, and taxiing is done while braking by a brake. Thus, consumption of fuel and wear of a brake by taxiing has been questioned. For the purpose of suppressing these problems, a proposal such as Patent Literature JP-T-2013-514229 below has been made. The proposal includes a motor for rotating a wheel of an aircraft, enables taxiing by rotating the wheel by the motor without using an engine for an aircraft, and suppresses consumption of energy and wear of a brake during taxiing.

Generally, a wheel of an aircraft stops rotation immediately before touchdown, and rotates suddenly by the friction with a runway immediately after touchdown. Then, the wheel is braked by a brake, and it is possible to slow down a whole aircraft by cooperating with other braking means such as an air brake. However, a severe friction occurs between the wheel and the runway during touchdown, and the wheel surface is greatly worn. For the purpose of reducing such wear, a proposal such as Patent Literature JP-A-2007-112408 has also been made. The proposal includes a motor for rotating a wheel prior to landing (pre-rotation), relieves the impact at touchdown, and suppresses the wear of a wheel by rotating the wheel to meet a relative speed of a runway.

A taxiing speed of an aircraft described above is relatively slow, approximately 35 km/h, and a large torque is required to move a heavy aircraft. Thus, a motor is required to have a low-speed high-torque output characteristic for rotating a wheel for taxiing.

On the other hand, a touchdown speed of an aircraft upon landing is relatively fast, 350 km/h or faster. It is sufficient to rotate only a wheel in pre-rotation. Thus, a motor is required to have a high-speed low-torque output characteristic for pre-rotation.

Taxiing and pre-rotation are both technologies utilizing a motor, but a required output characteristic is different. Thus, it is difficult to use a common motor to achieve both taxiing and pre-rotation.

In particular, when pre-rotation is performed by using a motor for taxiing, a high-speed rotation of about 10 times faster than taxiing is required, and a voltage of about 10 times greater than taxiing is required. Thus, when a wheel drive system is optimized according to a required voltage of a motor for taxiing, a withstand voltage of an electronic device such as an inverter provided in a voltage supply means exceeds an allowable value during pre-rotation. Contrarily, when a wheel drive system is optimized to meet a required voltage of a motor for pre-rotation, characteristics of an electronic device provided in a voltage supply means exceed those for taxiing, and production costs may extremely increase.

SUMMARY OF THE INVENTION

The present invention has been made to effectively resolve the above problems. In particular, it is an object of the invention to provide a wheel drive system for aircraft, which properly achieves both taxiing and pre-rotation by rotating a wheel by a common motor, and suppresses production costs with a simple configuration.

In order to achieve the above object, the present invention has taken the following measures.

A wheel drive system for aircraft according to an embodiment of the invention comprises a motor that is connected to a wheel, and has two voltage supply lines for supplying a voltage with varying a length of a winding to be energized; a voltage supply unit that supplies a voltage to the two voltage supply lines; and a control unit for controlling the voltage supply unit, wherein the control unit is configured to select one of the two voltage supply lines and supply a voltage to the selected voltage supply line, by controlling the voltage supply unit.

In such a configuration, the control unit supplies a voltage from the voltage supply unit, the motor is rotated, and the wheel is rotated by the motor. By changing a destination of the voltage supply of the voltage supply unit to one of the two voltage supply lines, it is possible to change the length of a winding to be energized. Thus, it is possible to obtain a low-speed high-torque output characteristic when driving by increasing the winding length, and obtain a high-speed low-torque output characteristic when driving by decreasing the winding length. Therefore, it is possible to perform taxiing of an aircraft at a low-speed high-torque, and perform pre-rotation of a wheel before landing at a high-speed low-torque by using a common motor. This suppresses an increase in manufacturing costs with a simple configuration, and achieves both taxiing and pre-rotation.

In order to reduce the size and weight of a motor by varying the length of a winding to be energized by using the same winding, it is preferable to provide a dividing point in the winding provided in the motor, and to configure two voltage supply lines of a first voltage supply line to be connected to one end and the other end of the winding, and a second voltage supply line to be connected to the one end and the dividing point.

In order to easily perform high-precision control by precisely changing the motor output characteristics, it is preferable to configure the winding by connecting a plurality of winding elements in series, and to set the dividing point in any one of the connecting portions of adjacent winding elements.

In order to construct a reliable system by suppressing an occurrence of failure while simplifying a whole circuit, the voltage supply unit preferably comprises a first voltage supply unit for supplying a voltage to the first voltage supply line, and a second voltage supply unit for supplying a voltage to the second voltage supply line, wherein the first voltage supply line is provided with a circuit opening and closing unit for opening and closing an electrical circuit configured between the first voltage supply unit and the winding.

In order to avoid an influence on a power supply line, prevent an occurrence of a failure and malfunction in other devices, and increase the safety, even if a fault occurs in a voltage supply unit, a circuit opening and closing unit, and a circuit or the like in a motor, it is preferable that the motor has multiple phases, the winding is provided for each phase, one end of each winding is connected to each other at a neutral point, and further connected to a power supply line through the neutral point, and a neutral point connecting and disconnecting unit, is further provided to enable an electrical connection and disconnection between the neutral point and one end of each winding.

According to the invention described above, it is possible to provide a wheel drive system for aircraft, which properly achieves both taxiing and pre-rotation by rotating a wheel using a common motor, and suppresses production costs with a simple configuration.

MODES FOR CARRYING OUT THE INVENTION

Hereinafter, embodiments of the present invention will be described with reference to the drawings.

Figure 1:
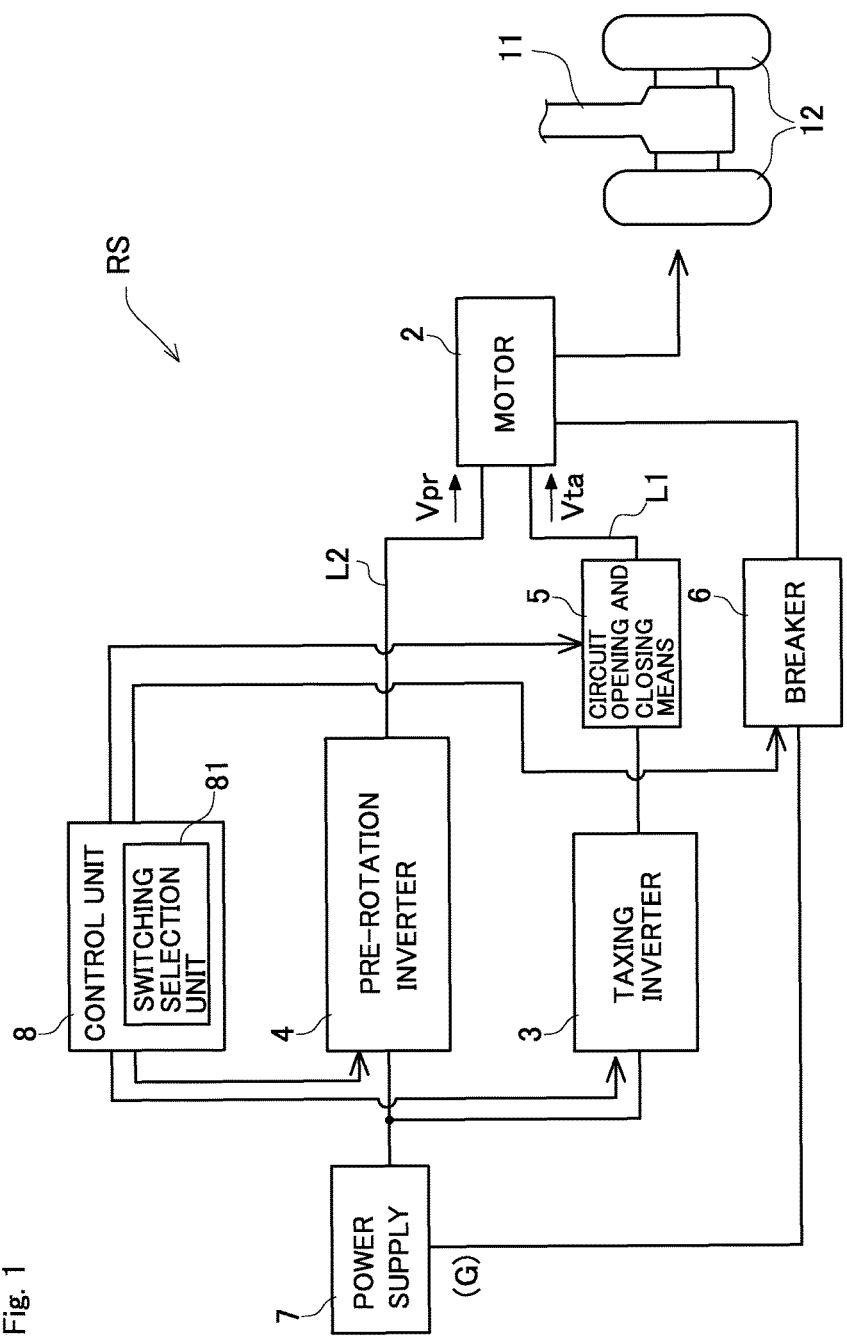
FIG. 1 is a block diagram of a wheel drive system for aircraft according to an embodiment of the invention.

A wheel drive system for aircraft RS according to an embodiment is configured as shown in FIG. 1. The wheel drive system for aircraft RS is configured to rotate and drive a wheel 12 that is supported by a support means 11 provided under an aircraft, and is comprised of a motor 2 that is directly or indirectly connected to the wheel 12, wherein the wheel 12 is rotated by the rotation of the motor 2. Although the wheel 12 is shown only two in this diagram, the wheel 12 may be provided in more number, and the power of the motor 2 may be distributed to rotate the wheels. Further, the diagram shows an example of wheel drive system for aircraft RS, in which wheels 12 are assumed to be provided in one support means 11, and the wheels 12 are rotated. Generally, an aircraft is provided with a plurality of such support means 11, and it is preferable to configure the wheel drive system for aircraft RS for each of the wheels 12 provided in each support means 11. In such a case, if a control unit 8 described later is configured as a common unit, it is possible to collectively control the wheels 12 provided in different support means 11, and synchronously rotate them with ease. This is more preferable.

As the motor 2, a permanent magnet synchronous motor is used. A rotor (not shown) has a permanent magnet, and a stator (not shown) have windings 21 for excitation (refer to FIG. 2). A rotor is rotated by energizing the windings 21 by applying an AC voltage. As long as required torque and rotational speed are obtained, the motor is not limited to the permanent magnet synchronous motor. The motor may be other appropriate types.

The motor 2 comprises two voltage supply lines L1 and L2 for energizing the windings 21. It is possible to supply a voltage (a taxiing voltage Vta) from a taxiing inverter 3, as a first voltage supply means, through the first voltage supply line L1, and supply a voltage (a pre-rotation voltage Vpr) from a pre-rotation inverter 4, as a second voltage supply means, through the second voltage supply line L2. The taxiing inverter 3 and the pre-rotation inverter 4 are configured to be supplied with power from a power supply 7 that is configured as a DC power supply, and generate the voltages Vta and Vpr required for rotating the motor 2 according to a control instruction from the control unit 8.

A circuit opening and closing means 5 is provided in the middle of an electrical circuit configured between the taxiing inverter 3 and motor 2. The circuit opening and closing means 5 is configured to open and close the electrical circuit based on an instruction from the control unit 8.

The motor 2 has a neutral point Pn between the windings 21 (refer to FIG. 2) as described later. The neutral point Pn is connected to a reference voltage line Vg that is one of the power supply lines of the power supply 7. A breaker 6 as a neutral point connecting and disconnecting means is provided between the neutral point Pn and each winding 21. The breaker 6 is configured to open and close the electrical circuit based on an instruction from the control unit 8.

The control unit 8 comprises an ordinary microprocessor or the like comprising a CPU, a memory, and an interface. The memory previously stores programs required for processing. The CPU sequentially retrieves and executes necessary programs, and achieves the functions described above in cooperation with peripheral hardware resources. A switching selection unit 81 is included in the control unit 8. The switching selection unit 81 selects one of the inverters 3 and 4. The control unit 8 operates one of the inverters 3 and 4, and supplies the motor 2 with the taxiing voltage Vta or the pre-rotation voltage Vpr.

Hereinafter, the above configuration will be explained in detail with reference to FIG. 2.

First, the motor 2 has three windings 21U, 21V, and 21E on the stator side. By applying three AC voltages with different phases to the windings 21U, 21V, and 21E, a rotating magnetic field can be generated in the stator (not shown). The windings 21U, 21V, and 21W have the same specifications. The winding 21 is configured by serially connecting four winding elements (coils) 21a, 21b, 21c, and 21d having the same winding length through the connecting portions P1, P2, and P3. Here, the winding length represents the length of the winding wound around an iron core or the like, and has substantially the same meaning as the number of turns, as long as the same core is used. One end Pa of each winding 21U, 21V, and 21W is connected at the neutral point Pn. One line 61 is comprised of a conductor leading to the neutral point Pn from one end Pa of each winding 21 (21U, 21V, 21W), and a conductor extending from the neutral point Pn. Through the line 61, one end Pa of each winding 21 (21U, 21V, 21W) is connected to a reference voltage line Vg of the power supply lines of the power supply 7.

Lines 33, 34, and 35 are drawn from the other end Pb of each winding 21. The first voltage supply line L1 is comprised of the lines 33, 34, 35, and the line 61 drawn from one end Pa of each winding 21. Lines 43, 44, and 45 are drawn from the connecting portion P1 nearest to the neutral point Pn out of the connecting portions P1, P2, and P3 provided in each winding 21. The second voltage supply line L2 is comprised of the lines 43, 44, 45, and the line 61 drawn from one end Pa of each winding 21. In other words, the connecting portion P1 divides only the winding element 21a, as a part of the entire winding 21, and functions as a dividing point P1 that enables to energize only the winding element 21a.

The taxiing inverter 3 is supplied with power when connected to a positive voltage line Vp and a negative voltage line Vn of the power supply lines provided in the power supply 7. The taxiing inverter 3 is configured to generate a three-phase taxiing voltage Vta (refer to FIG. 1)

by opening and closing six semiconductor switching elements 31 provided inside. A smoothing capacitor 32 is provided between the positive voltage line Vp and the negative voltage line Vn, to stabilize the voltage. The taxiing inverter 3 is connected to the three lines 33 to 35, and connected to the other ends Pb of the windings 21 (21U, 21V, 21W) through these lines. Further, as described above, since one end Pa of each winding 21 is connected to each other at the neutral point Pn through the line 61, and connected to the reference voltage line Vg through the neutral point Pn, the taxiing inverter 3 can apply an AC voltage corresponding to the phases U, V and, W constituting the taxiing voltage Vta, between one end Pa and the other end Pb of each winding 21 (21U, 21V, 21W), and energize the entire winding 21 by the taxiing voltage Vta.

The circuit opening and closing means 5 is provided to enable opening and closing of the electrical circuit configured between the taxiing inverter 3 and the windings 21 (21U, 21V, 21W). The circuit opening and closing means 5 is comprised of the breakers 51 to 54 provided in the middle of the lines 33 to 35 and 61. These breakers 51 to 54 are configured to open and close an electrical circuit according to an instruction from the control unit 8 (refer to FIG. 1). When the electrical circuit is in a closed state, the taxiing inverter 3 can supply a voltage to the windings 21. When the electrical circuit is in an open state, the electrical connection with the windings 21 is interrupted, and the taxiing inverter 3 is protected, even if an excessive voltage occurs at both ends of the winding 21. Further, the breakers 51 to 54 monitor the value of current flowing through the lines 33 to 35 and 61, and are automatically opened when the current value exceeds a certain value. Thus, even when an overcurrent momentarily occurs, the taxiing inverter 3 can be protected.

The pre-rotation inverter 4 has the same specifications as the taxiing inverter 3. Similar to the taxiing inverter 3, the pre-rotation inverter 4 is supplied with power when connected to a positive voltage line Vp and a negative voltage line Vn of the power supply lines provided in the power supply 7. The pre-rotation inverter 4 is configured to generate a three-phase pre-rotation voltage Vpr (refer to FIG. 1) by opening and closing six semiconductor switching elements 41 provided inside. A smoothing capacitor 42 is provided between the positive voltage line Vp and the negative voltage line Vn. The pre-rotation inverter 4 is connected to the three lines 43 to 45, and connected to the connecting portion P1 provided in each winding 21 (21U, 21V, 21W) through these lines. Further, as described above, since one end Pa of each winding 21 is connected to each other at the neutral point Pn through the line 61, and connected to the reference voltage line Vg through the neutral point Pn, the pre-rotation inverter 4 can apply an AC voltage corresponding to the phases U, V and, W constituting the pre-rotation voltage Vpr, between one end Pa of each winding 21 (21U, 21V, 21W) and the connecting portion Pb, that is, at both ends of one winding element 21a, and energize only the winding element 21a by the pre-rotation voltage Vpr.

On the lines drawn from one end of the Pa of each winding 21 (21U, 21V, 21W), on the way to the neutral point Pn, a breaker 6 as a neutral point connecting and disconnecting means is provided separately from the circuit opening and closing means 5. The breaker 6 is also configured to connect and disconnect the line 61 according to an instruction from the control unit 8 (refer to FIG. 1). When the line 61 is disconnected, the electrical connection is interrupted between one end Pa of each winding 21 (21U, 21V, 21W), the neutral point Pn, and the reference voltage line Vg ahead thereof. When the line 61 is connected, the electrical connection is made between one end Pa of each winding 21 (21U, 21V, 21W), the neutral point Pn, and the reference voltage line Vg ahead thereof.

The following operation is possible by using the wheel drive system for aircraft RS configured as above.

Figure 2:
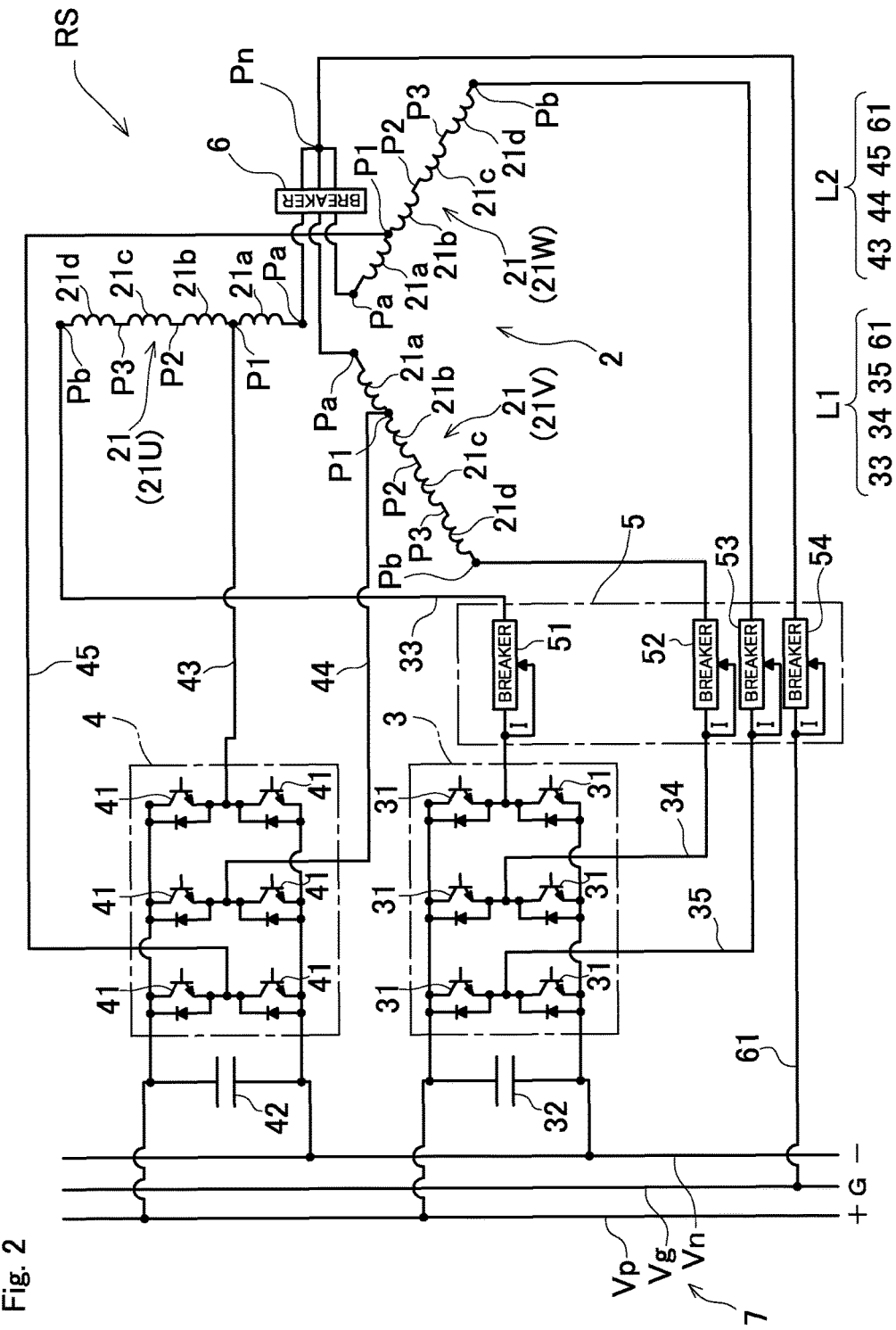
FIG. 2 is a circuit diagram of the wheel drive system for aircraft.
Figure 3:
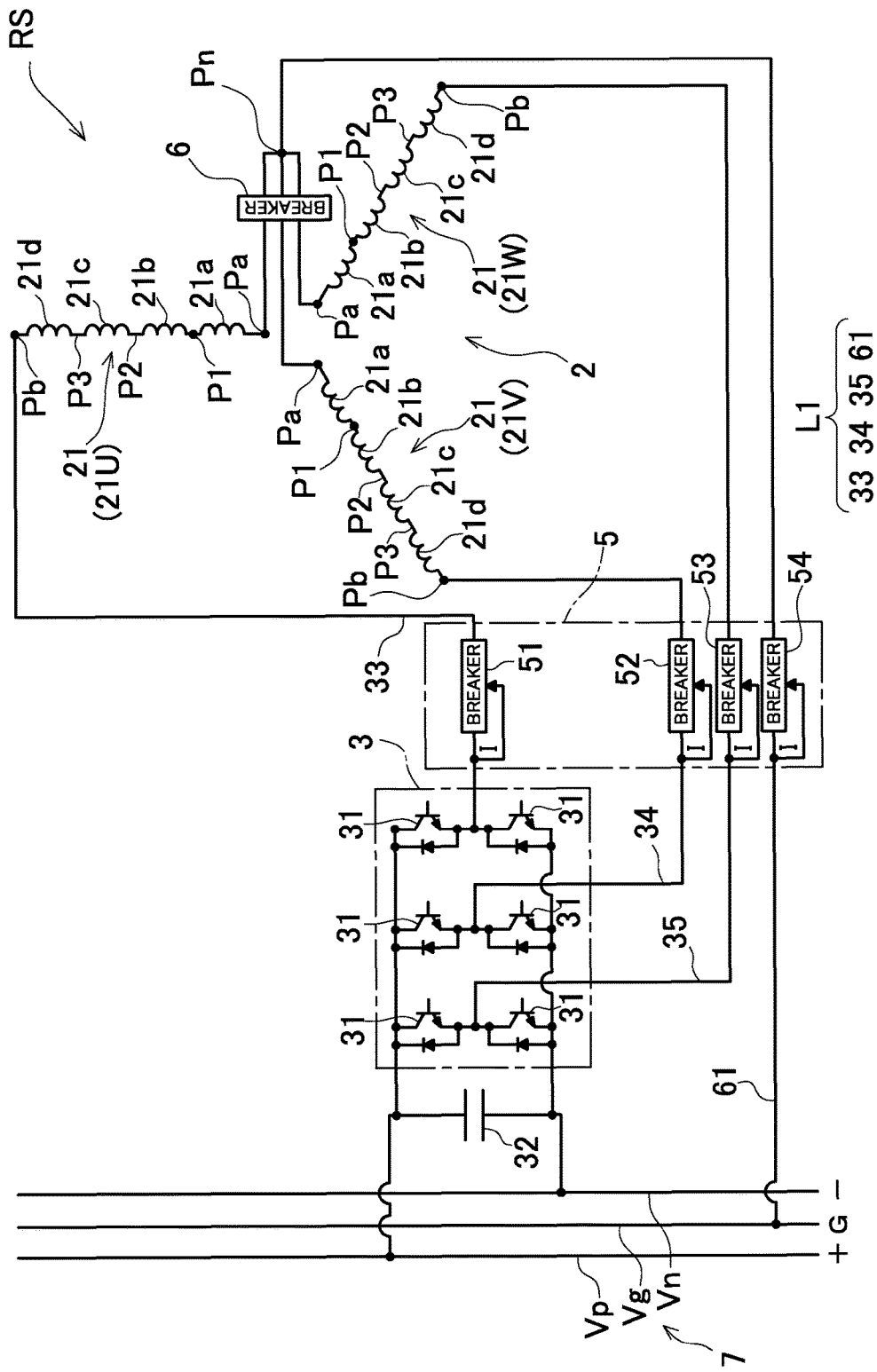
FIG. 3 is an explanatory diagram showing a part of the circuit diagram shown in FIG. 2 used for taxiing.

First, when moving an aircraft on a runway, that is, when performing the taxiing, the part shown in FIG. 3 of the circuit shown in FIG. 2 is operated. Hereinafter, an explanation will be given by using FIG. 3 while referring to FIG. 1.

For performing the taxiing, the control unit 8 selects the taxiing inverter 3 by the switching selection unit 81, and controls the taxiing inverter 3. In particular, by opening and closing the semiconductor switching element 31 provided in the taxiing inverter 3, the control unit 8 generates the three-phase taxiing voltage Vta based on the DC voltage obtained from the power supply 7. At this time, all semiconductor switching elements 41 provided in the not-selected pre-rotation inverter 4 are opened, and no voltage is supplied from the pre-rotation inverter 4.

Parallel to the control of the taxiing inverter 3, the control unit 8 closes the breakers 51 to 54 constituting the circuit opening and closing means 5, and closes the breaker 6.

Of the taxiing voltage Vta generated by the taxiing inverter 3, the AC voltages corresponding to the phases U, V, and W are applied across both ends Pa and Pb of each winding 21 (21U, 21V, 21W). Each winding 21 comprises winding elements 21a to 21d connected in series, and has about four times the length (the number of turns) for each winding element 21a to 21d. Here, a torque T obtained by the motor 2 when supplying a current I to a winding having the number of turns K has the relation, T=K·I. Thus, comparing at the same current, when rotating the motor 2 by using the taxiing inverter 3, it is possible to generate about four times the torque when rotating the motor 2 by using the pre-rotation inverter 4. Of course, the torque can be further increased by increasing the energizing quantity. Since the winding 21 is formed by connecting four same winding elements 21a to 21d, it is possible to properly manage the ratio of the length of the entire winding 21 to the winding element 21a as an integer ratio, and minimize an error in the rate of change in the output characteristics caused by switching the destination of the voltage supply.

When rotating the motor 2 by using the taxiing inverter 3 as described above, the motor 2 has a low-speed high-torque output characteristic, and it is possible to properly perform the taxiing by rotating the wheel 12 by the motor 2.

When an aircraft takes off after taxiing, the control unit 8 stops the voltage supply from the taxiing inverter 3, opens the breakers 51 to 54, and the breaker 6 constituting the circuit opening and closing means 5, and interrupts the electrical connection between the taxiing inverter 3 and the windings 21. An aircraft accelerates by using the driving force by a jet engine or the like, and takes off. The rotational speed of the wheel 12 during takeoff reaches about 10 times during taxiing, and a high counter electromotive voltage of about 10 times the voltage supplied during taxiing occurs at both ends of each winding 21. However, since the electrical connection is interrupted between the taxiing inverter 3 and the windings 21 as described above, the inverter 3 is protected without being influenced by the counter electromotive voltage. A counter electromotive force occurs also at both ends of the winding element 21a. However, as the length of the winding element 21a is about ¼ of the winding 21, the voltage is small, and does not affect the pre-rotation inverter 4.

While an aircraft is normally flying, the control unit 8 stops the voltage supply from the taxiing inverter 3 and the pre-rotation inverter 4. Thus, the motor 2 does not rotate, and the wheel remains stopped.

Figure 4:
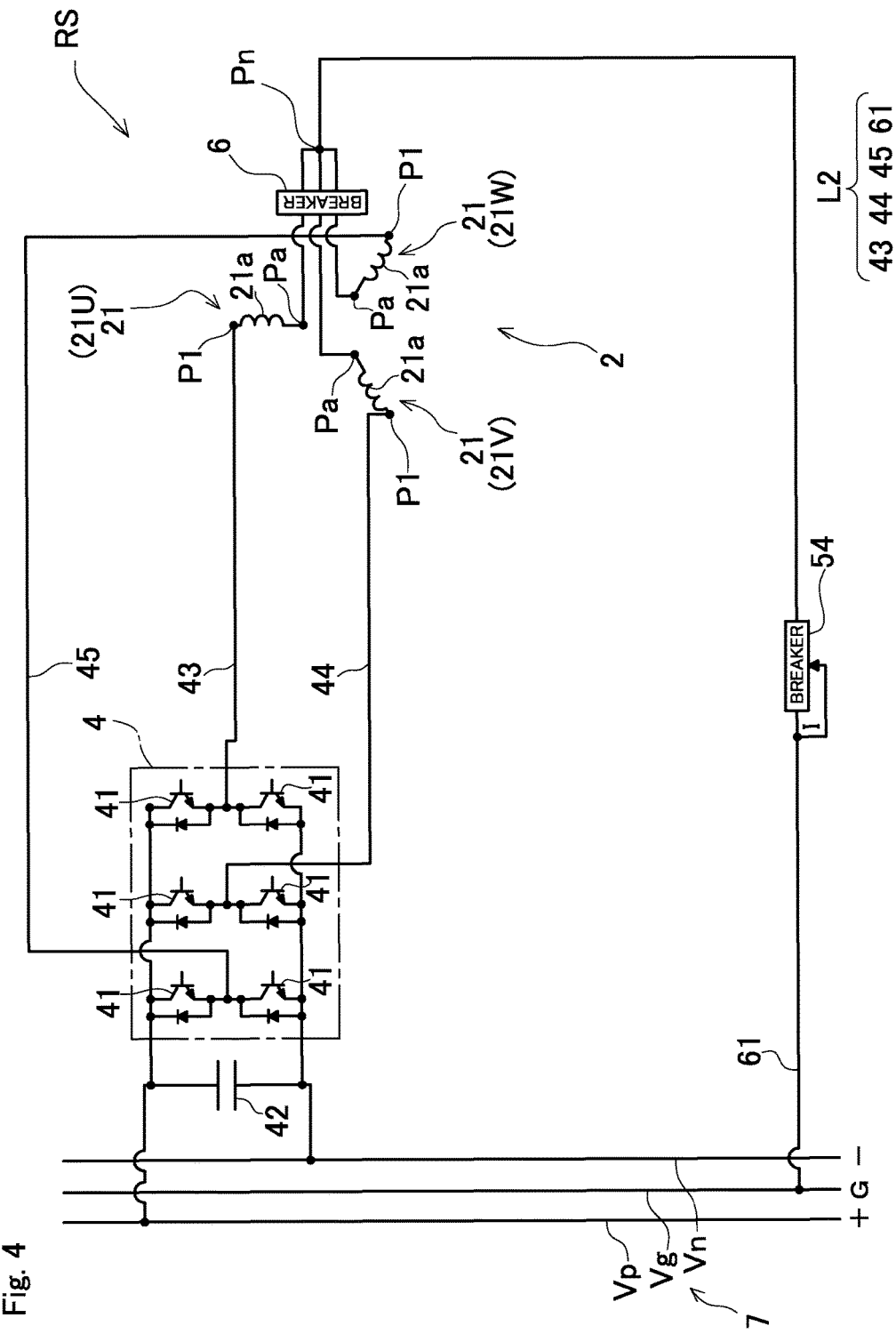
FIG. 4 is an explanatory diagram showing a part of the circuit diagram shown in FIG. 2 used for pre-rotation.

When an aircraft is landing, prior to touchdown, pre-rotation is performed to rotate the wheel 12. At that time, the portion shown in FIG. 4 of the circuit shown in FIG. 2 is operated. Hereinafter, an explanation will be given by using FIG. 4 while referring to FIG. 1.

For performing the pre-rotation, the control unit 8 selects the pre-rotation inverter 4 by the switching selection unit 81, and controls the pre-rotation inverter 4. In particular, by opening and closing the semiconductor switching element 41 provided in the pre-rotation inverter 4, the control unit 8 generates the three-phase pre-rotation voltage Vpr based on the DC voltage obtained from the power supply 7. At this time, all semiconductor switching elements 31 provided in the not-selected taxiing inverter 3 are opened, and no voltage is supplied from the taxiing inverter 3.

Parallel to the control of the pre-rotation inverter 4, the control unit 8 closes the breakers 51 to 53 constituting the circuit opening and closing means 5, and closes the breaker 54 and breaker 6. In other words, as a part of the electrical circuit is opened, the electrical connection is interrupted between the taxiing inverter 3 and the windings 21, but the electrical connection is made between one end Pa of each winding 21 (21U, 21V, 21W), the neutral point Pn, and the reference voltage line Vg ahead thereof.

Of the pre-rotation voltage Vpr generated by the pre-rotation inverter 4, the AC voltage corresponding to the phases U, V, and W is applied to both ends of the winding element 21a constituting the winding 21. The winding element 21a has about ¼ of the length (the number of turns) of the entire winding 21. Thus, When the same voltage is given, compared with the case of rotating the motor 2 by using the taxiing inverter 3, the output torque decreases, but the motor 2 can be rotated at a rotation speed of about four times faster. Thus, it is possible to rotate the motor 2 at a rotational speed of about ten times merely by increasing the output voltage Vpr from the pre-rotation inverter 4 to about 2.5 times the output voltage Vta from the taxiing inverter 3.

When rotating the motor 2 by using the pre-rotation inverter 4, the motor 2 has a high-speed low-torque output characteristic. When performing the pre-rotation, the wheel 12 is not grounded, and it is sufficient to rotate only the wheel 12. Thus, it is possible to sufficiently serve the purpose by such an output characteristic. It is possible to properly perform the pre-rotation by rotating the wheel 12 by the motor 2.

As the wheel 12 is rotated at a high speed by the pre-rotation, as during takeoff, a high counter electromotive voltage occurs at both ends of each winding 21. However, since the electrical connection is interrupted between the taxiing inverter 3 and the windings 21 as described above, the taxiing inverter 3 is protected without being influenced by the counter electromotive voltage.

At this time, when the breakers 51 to 53 fail for some reason, and the electrical connection is interrupted between the taxiing inverter 3 and the windings 21, the control unit 8 opens the breaker 6, and functions as double prevention means so as not to extend the influence of the failure of the breakers 51 to 53 to the other parts. Further, even when a short circuit occurs in the internal circuit of the motor 2, the control unit 8 remains the breaker 6 open to interrupt the current.

The wheel 12 is rotated by friction with the runway at touchdown, and a counter electromotive voltage occurs at both ends of the winding element 21a. However, the counter electromotive voltage remains at about the output voltage Vpr of the pre-rotation inverter 4, and does not affect the semiconductor switching element 41 or the like constituting the pre-rotation inverter 4, and causes no damages. On the other hand, a high counter electromotive voltage occurs at both ends of each winding 21, but as in the case where the wheel 12 is rotated by the pre-rotation, the electrical connection is interrupted, and the taxiing inverter 3 is not affected.

After an aircraft has landed and fully decelerated, the taxiing is performed up to a predetermined position, but it is sufficient to perform the same control as before the take-off.

As described above, the wheel drive system for aircraft RS according to the embodiment is characterized by comprising the motor 2 that is connected to the wheel 12, and provided with two voltage supply lines L1 and L2 for supplying the voltages Vta and Vpr with varying the length of the winding 21 to be energized; the taxiing inverter 3 and the pre-rotation inverter 4 as voltage supply means for supplying the voltage Vta and Vpr to the two voltage supply lines L1 and L2; and the control unit 8 for controlling the taxiing inverter 3 and the pre-rotation inverter 4, wherein the control unit 8 is configured to select one of the voltage supply lines L1 and L2, and supply the voltage Vta or Vpr to the selected voltage supply line L1 or L2, by controlling the taxiing inverter 3 and the pre-rotation inverter 4.

Being configured as above, the control unit 8 supplies the voltage Vta and Vpr from the taxiing inverter 3 and the pre-rotation inverter 4, the motor 2 is rotated thereby, and the wheel 12 can be rotated by the motor 2. It is also possible to change the energizing length of the winding 21 by changing the destination of the supply voltages Vta and Vpr from the taxiing inverter 3 and the pre-rotation inverter 4 to one of the two voltage supply lines L1 and L2. Thus, the low-speed high-torque output characteristic is obtained when driving by increasing the winding length, and the high-speed low-torque output characteristic is obtained when driving by decreasing the winding length. It is possible to perform taxiing an aircraft at a low-speed high-torque and pre-rotation of the wheel 12 at a high-speed low-torque before landing by using the common motor 2. Therefore, it is possible to achieve both taxiing and pre-rotation while suppressing an increase in manufacturing costs with a simple configuration.

The dividing point P1 is set in the winding 21 provided in the motor 2. The voltage supply lines L1 and L2 are comprised of the first voltage supply line L1 connected to one end Pa and the other end Pb of the winding 21, and the second voltage supply line L2 connected to one end Pa and the dividing point P1. Thus, it is possible to apply the voltages Vta and Vpr obtained from the taxiing inverter 3 and pre-rotation inverter 4 across the both ends Pa and Pb of the winding 21 through the first voltage supply line L1, and across one end Pa and the dividing point P1 of the winding 21 through the second voltage supply line L2. Therefore, it is possible to change the length of the winding 21 to be energized by using the same winding 21, and the size and weight of the motor 2 can be reduced.

Further, the winding 21 is configured by connecting a plurality of winding elements 21a to 21d in series, and the dividing point P1 is set in any one of the connecting portions P1, P2, and P3 between the adjacent winding elements 21a and 21b, 21b and 21c, and 21c and 21d. Thus, it is possible to manufacture by exactly managing the ratio of the winding elements 21a to 21d to the entire winding 21, and to change the output characteristic with high accuracy by switching the winding 21 to be energized. Therefore, it is possible to easily perform a high-precision control.

As a voltage supply means, there are provided the taxiing inverter 3 as a first voltage supply means for supplying the voltage Vta to the first voltage supply line L1, and the pre-rotation inverter 4 as a second voltage supply means for supplying the voltage Vpr to the second voltage supply line L2. The circuit opening and closing means 5 for opening and closing the electrical circuit configured between the taxiing inverter 3 and the winding 21 is provided on the first voltage supply line L1. This eliminates the necessity of a complex circuit configuration, such as, switching the connection destination by using a common voltage supply means. Thus, it is possible to construct a highly reliable system by simplifying the whole circuit. When rotating the motor 2 at a high speed by supplying the voltage Vpr from the pre-rotation inverter 4, the circuit opening and closing means 5 opens the electrical circuit configured between the taxiing inverter 3 and the winding 21, to prevent application of an excessive counter electromotive voltage to the taxiing inverter 3, thereby avoiding damage to the equipment.

The taxiing inverter 3 and the pre-rotation inverter 4 have the same specifications. This facilitates management of production and maintenance. Further, combining with the configuration able to change the length of the winding 21 to be energized by the taxiing inverter 3 and the pre-rotation inverter 4, it is possible to change the characteristics of the motor 2 without greatly changing the voltages Vta and Vpr supplied from the inverters 3 and 4. This eliminates the necessity of using expensive equipment corresponding to the control in a wide voltage range, and suppresses an increase in manufacturing costs.

In addition, the motor 2 has multiple phases U, V, and W, and has the windings 21 for each of the phases U, V, and W. One end Pa of each winding 21 is connected to each other at the neutral point Pn, through which the motor 2 is connected to the reference voltage line Vg constituting the power supply line. The motor 2 further comprises the breaker 6 as a neutral point connecting and disconnecting means that enables an electrical connection and disconnection between the neutral point Pn and one end Pa of each winding 21. Thus, even when a failure occurs in the taxiing inverter 3, the pre-rotation inverter 4, the circuit opening and closing means 5, or the internal circuit or the like of the motor 2, the breaker 6 cuts off the connection between one end Pa of each winding 21, the neutral point Pn, and the reference voltage line VG ahead thereof. Therefore, it is possible to avoid an influence to the power supply 7, prevent a failure and malfunctions in the other devices, and enhance the safety of aircraft.

The specific structure of each part is not intended to be limited only to the embodiment described above.

For example, in the embodiment described above, the winding 21 comprises four winding elements 21a to 21d of the same length. As long as the winding comprises a plurality of winding elements, the same effects can be obtained. In other words, the winding 21 is comprised of n number of winding elements, a line is drawn out from the dividing point P1 that can divide the winding into one winding element and the n−1 number of winding elements, and a part for applying a voltage is switched. In this way, the output torque can be changed at the ratio of 1:n. When the value of n is increased to 4 or greater, it is possible to increase the difference between the low-speed high-torque output characteristic and the high-speed low-torque output characteristic.

Further, the dividing point for dividing the winding 21 is not necessary to be the closest to the neutral point Pn, and may be appropriately changed.

When the request to the small size and light weight of the motor 2 is small, a long winding and a short winding may be incorporated in each separate stator. The first voltage supply line L1 may be connected to the long winding, and the second voltage supply line L2 may be connected to the short winding. It is possible to obtain the same effects as those described above also in this case.

Further, in the embodiment described above, the motor 2 is configured as a three-phase motor that is rotated by a three-phase AC voltage. In principle, the same configuration is possible with either a single-phase motor or a multiphase motor other than a three-phase motor. The same effects can be obtained in this case.

In the embodiment described above, the taxiing inverter 3 and pre-rotation inverter 4 are connected to the first voltage supply line L1 and second voltage supply line L2, respectively. It is possible to configure the taxiing inverter 3 and pre-rotation inverter 4 by a common inverter, and use the inverter in switching to the first voltage supply line L1 for the taxiing, and the second voltage supply line L2 for the pre-rotation. The same effects can also be obtained in this case.

For the other configurations, the present invention can be variously modified without departing from the scope of the invention.

What is claimed is:

1. A wheel drive system for aircraft, comprising
   a motor that is connected to a wheel, and has a first voltage supply line having a first winding length and a second voltage supply line having a second winding length different from the first winding length such that voltage is varied when either receives a supply;
   a voltage supply unit that supplies a voltage to the first voltage supply line and the second voltage supply line; and
   a control unit for controlling the voltage supply unit, wherein
   the control unit is configured to select one of the first voltage supply line and the second voltage supply line and supply a voltage to the selected voltage supply line, by controlling the voltage supply unit.

2. The wheel drive system for aircraft according to claim 1, wherein
   a winding provided in the motor includes a dividing point inside, and
   the first voltage supply line is connected to one end and the other end of the winding, and the second voltage supply line is connected to the one end and the dividing point.

3. The wheel drive system for aircraft according to claim 2, wherein
   the winding is configured by connecting a plurality of winding elements in series, and the dividing point is set in any one of connecting portions of adjacent winding elements.

4. The wheel drive system for aircraft according to claim 2, wherein
   the voltage supply unit comprises a first voltage supply unit for supplying a voltage to the first voltage supply line, and a second voltage supply unit for supplying a voltage to the second voltage supply line, and a circuit opening and closing unit for opening and closing an electrical circuit configured between the first voltage supply unit and the winding is provided on the first voltage supply line.

5. The wheel drive system for aircraft according to claim 3, wherein the voltage supply unit comprises a first voltage supply unit for supplying a voltage to the first voltage supply line, and a second voltage supply unit for supplying a voltage to the second voltage supply line, and a circuit opening and closing unit for opening and closing an electrical circuit configured between the first voltage supply unit and the winding is provided on the first voltage supply line.

6. The wheel drive system for aircraft according to claim 4, wherein the motor has multiple phases, and has the winding for each phase, one end of each winding is connected to each other at a neutral point, and further connected to a power supply line through the neutral point, and the wheel drive system further comprises a neutral point connecting and disconnecting unit that enables an electrical connection and disconnection between the neutral point and one end of each winding.

7. The wheel drive system for aircraft according to claim 5, wherein the motor has multiple phases, and has the winding for each phase, one end of each winding is connected to each other at a neutral point, and further connected to a power supply line through the neutral point, and the wheel drive system further comprises a neutral point connecting and disconnecting unit that enables an electrical connection and disconnection between the neutral point and one end of each winding.

* * * * *